(12) United States Patent
Gentry et al.

(10) Patent No.: US 11,928,290 B2
(45) Date of Patent: Mar. 12, 2024

(54) UNINTENTIONAL TOUCH DETECTION

(71) Applicant: Cypress Semiconductor Corporation, San Jose, CA (US)

(72) Inventors: Troy Gentry, Murrieta, CA (US); David Durlin, Castle Rock, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/295,084

(22) Filed: Apr. 3, 2023

(65) Prior Publication Data

US 2024/0028161 A1    Jan. 25, 2024

Related U.S. Application Data

(60) Provisional application No. 63/391,195, filed on Jul. 21, 2022.

(51) Int. Cl.
  *G06F 3/041*  (2006.01)
  *G06F 3/044*  (2006.01)

(52) U.S. Cl.
  CPC ...... *G06F 3/04186* (2019.05); *G06F 3/04166* (2019.05); *G06F 3/044* (2013.01); *G06F 2203/04108* (2013.01)

(58) Field of Classification Search
  CPC .. G06F 3/04166; G06F 3/04186; G06F 3/044; G06F 2203/04108
  See application file for complete search history.

(56) References Cited

U.S. PATENT DOCUMENTS 8,547,114 B2    10/2013   Kremin
8,902,172 B2 *  12/2014   Peng ................... G06F 3/04186
                                                       345/173

* cited by examiner

*Primary Examiner* — Michael Pervan

(57) ABSTRACT

A scanning operation is performed to measure a first capacitance of a first sensor arrangement located proximate a capacitive sensor that corresponds to a function of a device. In response to the first capacitance not exceeding a first threshold, the scanning operation measures a second capacitance of the capacitive sensor to create an output used to control the function of the device. In response to the first capacitance exceeding the first threshold, operation of the scanning operation is modified to skip measuring of the second capacitance or to refrain from transmitting the output to a host of the device for controlling the function.

20 Claims, 11 Drawing Sheets

UNINTENTIONAL TOUCH DETECTION

RELATED APPLICATIONS

This application claims priority to U.S. Provisional Patent Application No. 63/391,195, filed on Jul. 21, 2022, titled "DETECTING ACTIVE RAIN WATER ON TOUCH PANEL," which is incorporated herein by reference

TECHNICAL FIELD

The present disclosure relates to the field of unintentional touch detection.

BACKGROUND

Many devices include input elements through which users can interface with the devices. These devices may include a device with a human-machine interface, a kiosk, an indoor or outdoor electronic device, a smart device such as a smart speaker, a portable device, etc. For example, a smart speaker may include input elements, such as a volume slider, a power button, a wireless connection configuration button, and/or other types of input elements. An input element may include a capacitive sensor, such as a self-capacitive sensor, used to detect human touches and/or hover gestures to facilitate operation of an associated device.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a method is provided. The method includes measuring, by a scanning operation, a first capacitance of a first sensor arrangement located proximate a capacitive sensor that corresponds to a function of a device. In response to the first capacitance not exceeding a first threshold, the scanning operation measures a second capacitance of the capacitive sensor to create an output used to control the function of the device. In response to the first capacitance exceeding the first threshold, operation of the scanning operation is modified to skip measuring of the second capacitance or to refrain from transmitting the output to a host of the device for controlling the function.

In an embodiment of the techniques presented herein, an apparatus is provided. The apparatus includes a means for measuring, by a scanning operation, a first capacitance of a first sensor arrangement located proximate a capacitive sensor that corresponds to a function of a device. The apparatus includes a means for in response to the first capacitance not exceeding a first threshold, measuring by the scanning operation a second capacitance of the capacitive sensor to create an output used to control the function of the device. The apparatus includes a means for in response to the first capacitance exceeding the first threshold, modifying operation of the scanning operation to skip measuring of the second capacitance or to refrain from transmitting the output to a host of the device for controlling the function.

In an embodiment of the techniques presented herein, a system is provided. The system includes a first capacitive sensor corresponding to a first function of a device. The system includes a sensor arrangement proximate the first capacitive sensor. The sensor arrangement comprises a plurality of proximity sensors electrically coupled together so that the plurality of proximity sensors are electrically equivalent. The plurality of proximity sensors are physically separate proximity sensors. The system includes a scanning circuit that implements a scanning operation. The scanning operation measures a first capacitance of the sensor arrangement. In response to the first capacitance not exceeding a first threshold, the scanning operation measures a second capacitance of the first capacitive sensor to create a first output used to control the first function of the device. In response to the first capacitance exceeding the first threshold, the scanning operation skips measuring the second capacitance or refrains from transmitting the first output to a host of the device for controlling the first function.

In an embodiment of the techniques presented herein, a method is provided. The method includes measuring a first capacitance of a sensor arrangement comprising at least two electrically coupled proximity sensors located proximate a capacitive sensor. The capacitive sensor is grounded while measuring the first capacitance of the sensor arrangement. In response to the first capacitance not exceeding a first threshold, a second capacitance of the capacitive sensor is measured to create an output. In response to the first capacitance exceeding the first threshold, measuring the second capacitance is skipped or transmission of the output to a host is refrained from being performed.

In an embodiment of the techniques presented herein, an apparatus is provided. The apparatus includes a means for measuring a first capacitance of a sensor arrangement comprising at least two electrically coupled proximity sensors located proximate a capacitive sensor, where the capacitive sensor is grounded while measuring the first capacitance of the sensor arrangement. The apparatus includes a means for in response to the first capacitance not exceeding a first threshold, measuring a second capacitance of the capacitive sensor to create an output. The apparatus includes a means for in response to the first capacitance exceeding the first threshold, skipping measuring the second capacitance or refraining from transmitting the output to a host.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
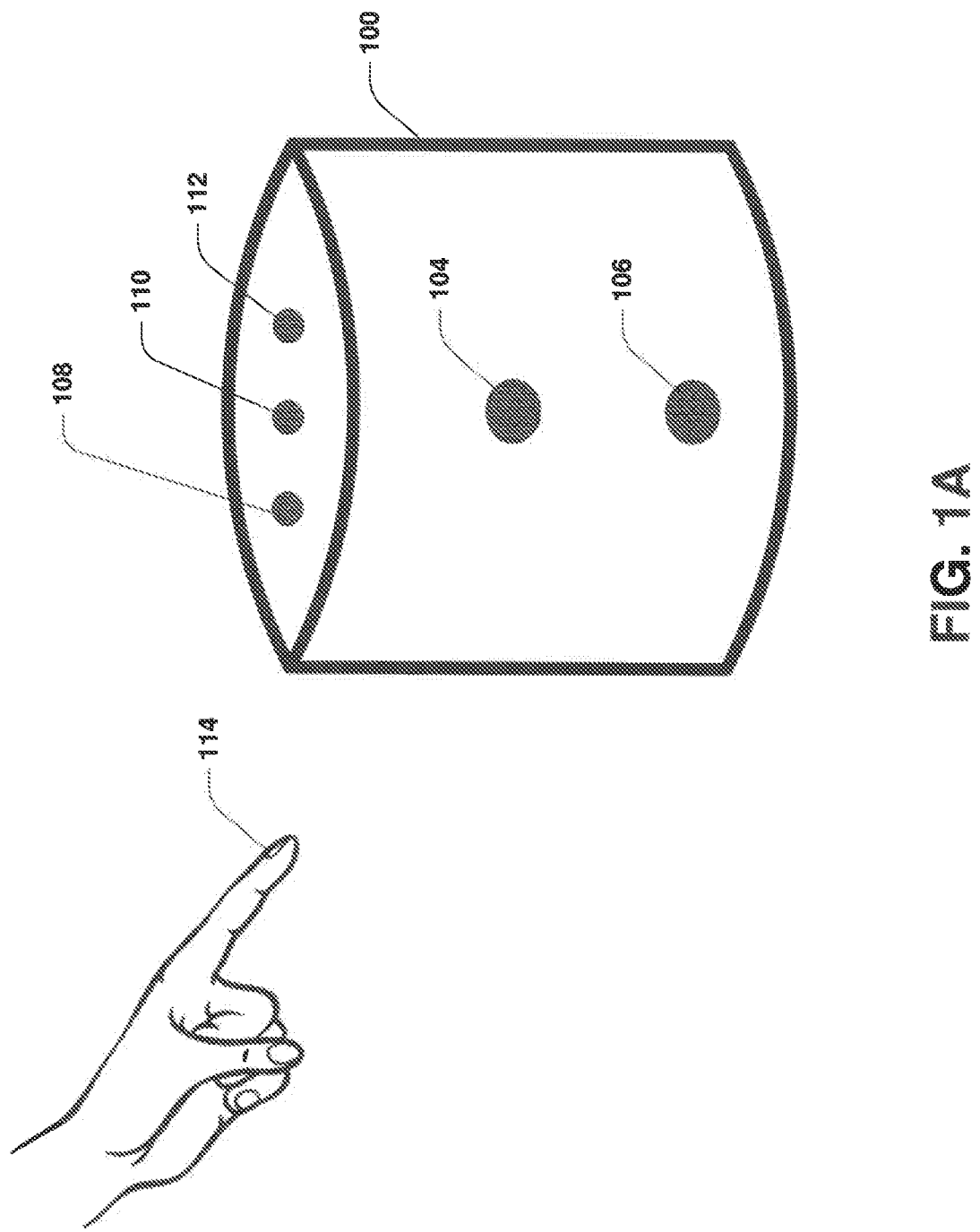
FIG. 1A is a component block diagram illustrating a device for which unintentional touch detection is implemented in accordance with at least some of the techniques presented herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Systems and methods are provided for unintentional touch detection. Many types of devices (e.g., kiosks, smart devices such as a smart speaker, portable electronic devices, laptops, and/or other devices) include user interfaces such as human-machine interfaces. A human-machine interface may include input elements used to detect user input (e.g., a user pressing or hovering over a volume up button of a smart speaker). The input elements may comprise capacitive sensors. A capacitive sensor is configured to detect the presence of a capacitive object (e.g., a human finger) as an interaction event (a touch event) based upon a measured capacitance of the capacitive sensor. The capacitive sensor may be a self-capacitive sensor where a capacitance of the capacitive object is added to a capacitance of the self-capacitive sensor (a baseline/parasitic capacitance), which is measured as an analog signal that is converted to a digital value representing a total capacitance detected by the self-capacitive sensor.

If the total capacitance detected by a capacitive sensor of the volume up button exceeds a threshold of a certain capacitance value (e.g., a sensor signal exceeding finger threshold of 50 or greater), then a determination is made that the capacitive object interacted with the volume up button, such as where a finger of a user pressed the volume up button. Accordingly, functionality of the volume upon button may be invoked such as to turn up the volume of the smart speaker. If the total capacitance detected by the self-capacitive sensor of the volume up button does not exceed the threshold, then a determination is made that no capacitive object has interacted with the volume up button and the functionality is not invoked. The threshold may take into account a baseline self-capacitance (e.g., a parasitic capacitance) of the capacitive sensor.

Capacitive touch sensing is used as part of human-machine interfaces for devices such as smart home devices, which could be portable and used indoors and/or outdoors. These smart home devices have demanding human-machine interface requirements, such as low latency and robustness where input elements (e.g., buttons, sliders, etc.) function correctly without computationally expensive post processing that would contribute to increased latency of the device, and thus a reduced user experience. In order for a capacitive sensor of an input element to function correctly, the capacitive sensor should not inadvertently/erroneous detect input when a user is not interacting with the input element. This inadvertent touch detection can be caused by many factors, such as rain, a coffee spill, a cell phone placed over a button, keys placed nearby the button, other liquids, and/or other capacitive objects coming in contact with or close proximity to the capacitive sensor, which could trigger the capacitive sensor to detect an input event when a user is not interacting with the input element.

Many conventional sensor layouts are configured to improve the sensitivity of capacitive sensors in order to ignore liquid or other causes of unintentional touch detection. When a capacitive sensor of an input element is being sensed (measured) to determine whether the input element is being interacted with by a user, other capacitive sensors are driven to a same voltage as that capacitive sensor. This avoids the creation of conductive paths to ground, thus improving the sensitivity of the capacitive sensor being sense. Unfortunately, even with increasing the sensitivity of the capacitive sensor, the capacitive sensor can still erroneously detect unintentional touches due to rain, liquids, and/or other capacitive objects. This results in erroneous operation of a device such as where the smart speaker increases or decreases volume based upon rain or a liquid spill coming in contact with a volume button.

In order to improve the operation of devices that utilize capacitive sensors for detecting user interaction/input with input elements, the techniques provided herein are capable of stopping a device from performing unwanted operations in response to unintentional touches. In particular, a device includes one or more capacitive sensors that corresponding to functions of the device (e.g., a capacitive sensor of an input element such as a power button corresponding to a power function of the device for turning the device on and off). The device includes one or more proximity sensors that may also operate as capacitive sensors, but do not correspond to functions of the device. Multiple proximity sensors are electrically coupled together (ganged) to form a sensor arrangement. Certain proximity sensors may be dynamically selected, such as by a multiplexer, for forming the sensor arrangement. The sensor arrangement may be dynamically mapped to one or more corresponding capacitive sensors, such as the capacitive sensor of the input element used to control the power function of the device. The sensor arrangement is used to detect unintentional touches, such as rain, liquid, keys, or other capacitive objects that could cause the corresponding capacitive sensors to detect an unintentional touch that is not a user interacting with input elements that includes the corresponding capacitive sensors.

Before sensing the capacitive sensor (e.g., measuring a capacitance of the corresponding capacitive sensors), a capacitance of the sensor arrangement is measured. If the capacitance of the sensor arrangement exceeds a first threshold, then an unintentional touch is detected (e.g., a liquid has been spilled on the capacitive sensor and/or the sensor arrangement). Accordingly, either the capacitive sensor is not sensed to create an output corresponding to the power function (e.g., a capacitance of the captive sensor is not measured to see if the power function should be invoked) or the output from sensing the capacitive sensor is ignored and not output to a host of the device for performing the power function. This is because the liquid spill on the capacitive sensor would otherwise result in an output that would invoke the power function even though a user is not interacting with the power button. The capacitive sensor is not sensed or the output is ignored until a subsequent capacitance measurement of the sensor arrangement is below the first threshold indicating that there is no unintentional touch (e.g., the liquid is no longer touching the sensor arrangement).

If the capacitance of the sensor arrangement does not exceed the first threshold, then no unintentional touch is detected. Accordingly, the capacitive sensor is sensed where a capacitance of the capacitive sensor is measured. If the capacitance exceeds a second threshold, then a touch event is detected as the output. The output is transmitted to the host of the device for controlling the power function. If the capacitance does not exceed the second threshold, then no touch event is detected.

In this way, one or more sensor arrangements of electrically coupled proximity sensors (e.g., self-capacitive sensors that do not correspond to functionality of the device, but are configured for unintentional touch detection) are used to detect unintentional touches. In contrast to conventional techniques for mitigating unintentional touches where a sensitivity of a capacitive sensor is increased by driving other sensors to a same voltage of the capacitive sensor during sensing, this technique drives the other sensors to ground when the sensor arrangement is being sensed for detecting whether there is an unintentional touch. This increases the magnitude of any unintentional touches being detected by the sensor arrangement so that the unintentional touches are easily detected. In this way, the first threshold used to detect an unintentional touch by the sensor arrangement is much larger than the second threshold used to detect user input with the capacitive sensor (a touch event). This makes it easier to identify and distinguish between unintentional touches from actual user input (e.g., liquid on the sensor arrangement will have a much higher capacitance measurement than a finger press on the power button). Also, the sensor arrangement is measured as a leading signal before determining whether and how to sense the capacitive sensor associated with the power function. In this way, operation of devices that use capacitive sensors is improved so that unwanted/erroneous operation of the device does not occur from unintentional touches.

FIG. 1A is a component block diagram illustrating a device 100 for which unintentional touch detection is implemented in accordance with at least some of the techniques presented herein. The device 100 (e.g., a portable speaker) may comprise various input elements that correspond to functionality of the device. In some embodiments, the device 100 comprises a power input button 104 corresponding to a power function used to turn the device on and off. The device 100 comprises a wireless connectivity button 106 corresponding to a wireless pairing function used to connect the device to another device over a wireless communication connection. The device 100 may comprise other input elements, such as a volume up button 108, a volume down button 110, a channel button 112, and/or other input elements used to control various functions of the device 100.

The input elements may include capacitive sensors used to detect user interaction with the input elements based upon measured capacitances of the capacitive sensors when the capacitive sensors are being sensed/measured. In some embodiments, a user may use a finger 114 to press the volume up button 108 in order to increase a volume of the device 100. When the finger 114 presses the volume up button 108, a capacitance of the finger 114 is added to a baseline capacitance (e.g., a parasitic capacitance) of a capacitive sensor of the volume up button 108. When the capacitive sensor of the volume up button 108 is sensed/measured, a capacitance of the volume up button 108 is measured. The measured capacitance may be measured as an analog signal that is converted to a digital value. The measured capacitance (the digital value) is compared to a threshold capacitance. If the measured capacitance exceeds the threshold capacitance, then an interaction event (a touch event) is detected and the volume of the device 100 is increased.

The capacitive sensors may be susceptible to detecting unintentional touches as interaction events, which would be treated the same as user interaction with the input elements of the device 100. This leads to unwanted/erroneous operation of the device 100 such as where an unintentional touch is detected as user input that modifies operation of the device 100 (even though the unintentional touch is not a user interacting with the device 100, but could be from a liquid or other capacitive object touching the device 100).

Figure 1B:
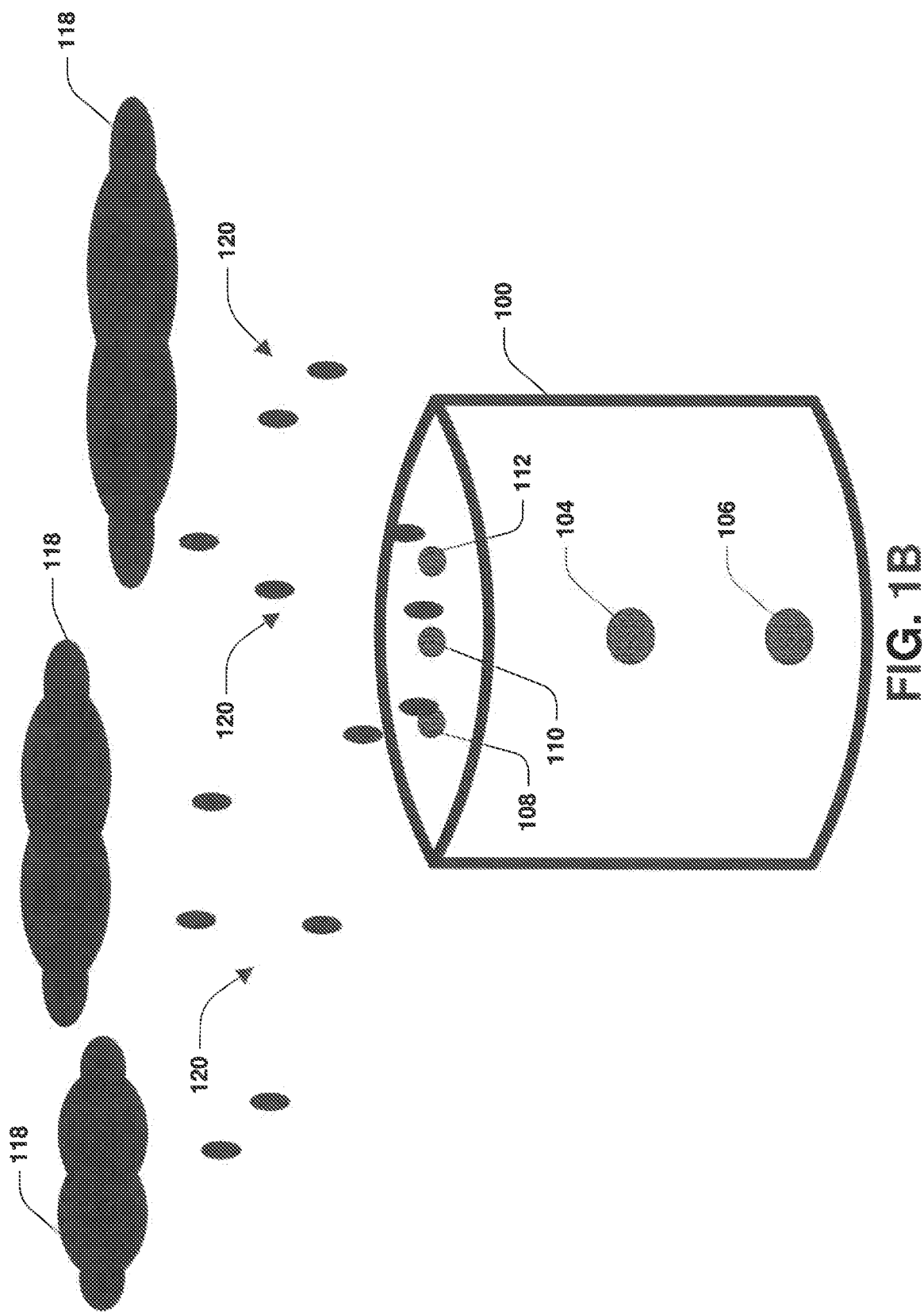
FIG. 1B is a component block diagram illustrating a device for which unintentional touch detection is implemented in accordance with at least some of the techniques presented herein.

FIG. 1B illustrates an embodiment of detecting an unintentional touch of the device 100 so that unwanted operation of the device 100 does not occur. The device 100 may be located outside where there is rain 120 from clouds 118. Some of the rain 120 may land on the device 100, such as on the volume up button 108. Without the techniques described herein for unintentional touch detection, the rain 120 on the volume up button 108 may cause the capacitive sensor of the volume up button 108 to have a capacitance exceeding the threshold. This results an output to a host of the device 100. The output causes the host to increase the volume of the device 100 even though a user has not interacted with the volume up button 108.

In order to stop the device 100 from performing unwanted operations in response to unintentional touches, one or more sensor arrangements may be used to detect the unintentional touches. The one or more sensor arrangements may be disposed proximate the capacitive sensors of the input elements of the device 100 (e.g., the volume up button 108, the volume down button 110, the channel button 112, etc.). It may be appreciated that example configurations of sensor arrangements are further illustrated by FIGS. 3A-3C and 4. With the use of the sensor arrangements, unintentional touches can be detected (touches that are not user input) so that functionality of the device 100 is not inadvertently/erroneously invoked from the unintentional touches. For example, a sensor arrangement includes multiple proximity sensors that are located proximate (e.g., surrounding, at least partially surrounding, adjacent to, etc.) the capacitive sensor of the volume up button 108. Before the capacitive sensor of the volume up button 108 is sensed to measure a capacitance of the capacitive sensor to see if the volume should be increased, a capacitance of the sensor arrangement is measured. When measuring the capacitance of the sensor arrangement, other sensors (e.g., capacitive sensors of the input elements and/or other sensor arrangements) may be driven to ground to increase a sensitivity/magnitude of the measured capacitance signal of the sensor arrangement so that the rain 120 is easier to detect and distinguish from user interaction/input (e.g., a touch event) that would have a much lower magnitude than the unintentional touch from the rain 120.

If the capacitance of the sensor arrangement exceeds a threshold such as due to the rain 120 touching the one or more of the proximity sensors of the sensor arrangement, then the capacitive sensor of the volume up button 108 and/or other capacitive sensors to which the sensor arrangement is mapped are either not sensed/measured or an output of sensing/measuring the capacitive sensor of the volume up button 108 and/or the other capacitive sensors is ignored (e.g., not routed to the host of the device 100 for increasing the volume). If the capacitance of the sensor arrangement does not exceed the threshold, then the capacitive sensor of the volume up button 108 is sensed to create an output. The output may be used to control the volume up functionality of the device 100 such as where the capacitance of the capacitive sensor exceeds a touch threshold. In some embodiments, the threshold for unintentional touch detection is set to a value larger than the touch threshold corresponding to an expected value of a touch input (e.g., a touch threshold around 50). In some embodiments, the threshold for unintentional touch detection is set to a sensor signal/count of 125 or some other value since other sensors are being grounded when the capacitance of the sensor arrangement is being measured, which causes a capacitance measurement of an unintentional touch to have a much larger magnitude than an actual touch input.

In some embodiments, a selection component such as a multiplexer may be used to dynamically configure sensor arrangements for the device 100. In some embodiments, a first set of proximity sensors may be selected as the sensor arrangement, such as proximity sensors located near the volume up button 108, the volume down button 110, and the channel button 112 that are located at a top side of the device 100. The selection component may select these proximity sensors based upon various factors. The selection component may select the first set of proximity sensors based upon a current location of the device 100 such as whether the device is currently located indoors or outdoors. The selection component may select the first set of proximity sensors based upon distances between the proximity sensors. The selection component may select the first set of proximity sensors based upon distances between the volume up button 108, the volume down button 110, and the channel button 112.

The selection component may select the first set of proximity sensors based upon orientation of the device 100 (e.g., an accelerometer, a magnetometer, a gyroscope, or other sensors of the device 100 may provide orientation information). For example, the orientation may be used to select proximity sensors more likely to be affected by the rain 120 or other capacitive objects (e.g., proximity sensors on the top side of the device 100 compared to proximity sensors on a side of the device 100 such as near the power input button 104 and the wireless connectivity button 106). If the orientation of the device 100 changes, then the selection component may dynamically select a different set of proximity sensors as the sensor arrangement (e.g., selection of the proximity sensors located on the side of the device 100 near the power input button 104 and the wireless connectivity button 106 based upon the device 100 being reoriented such that the power input button 104 and the wireless connectivity button 106 are now facing up towards the clouds 118.

Other selection factors for dynamically defining and/or redefining a sensor arrangement may relate to a proximity sensor failing, a capacitive sensor failing, detecting user feedback that an unintentional touch not detected by the sensor arrangement was incorrectly detected as a touch event by a capacitive sensor, historic information and/or user feedback indicating current imprecision of unintentional touch detection (e.g., if unintentional touches are not being detected by sensor arrangements, then new sensor arrangements and/or other mappings may be attempted to improve imprecision), etc. In this way, one or more sensor arrangements may be dynamically defined and redefined.

Figure 2:
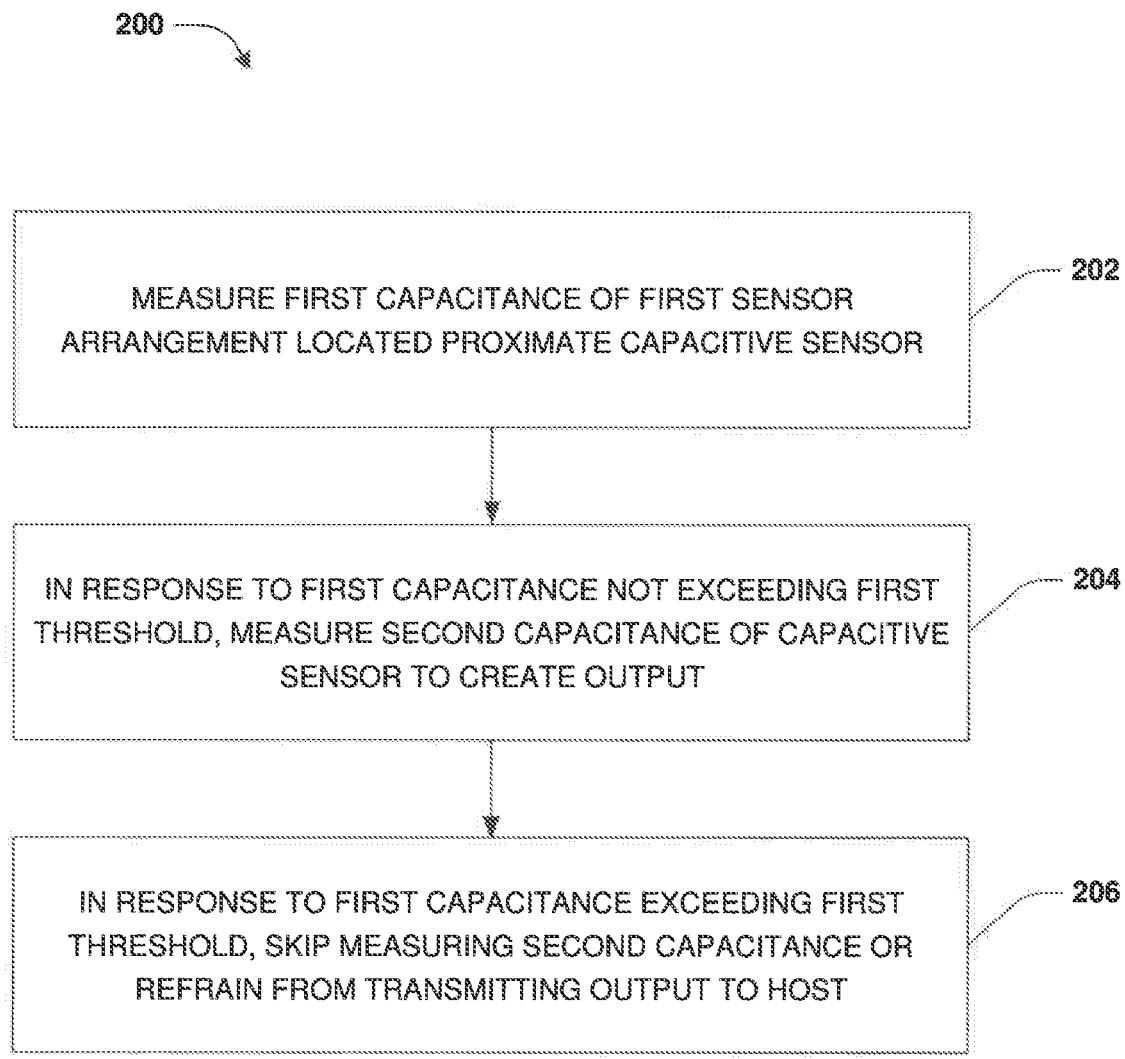
FIG. 2 is an illustration of an example method for unintentional touch detection in accordance with at least some of the techniques presented herein.
Figure 3A:
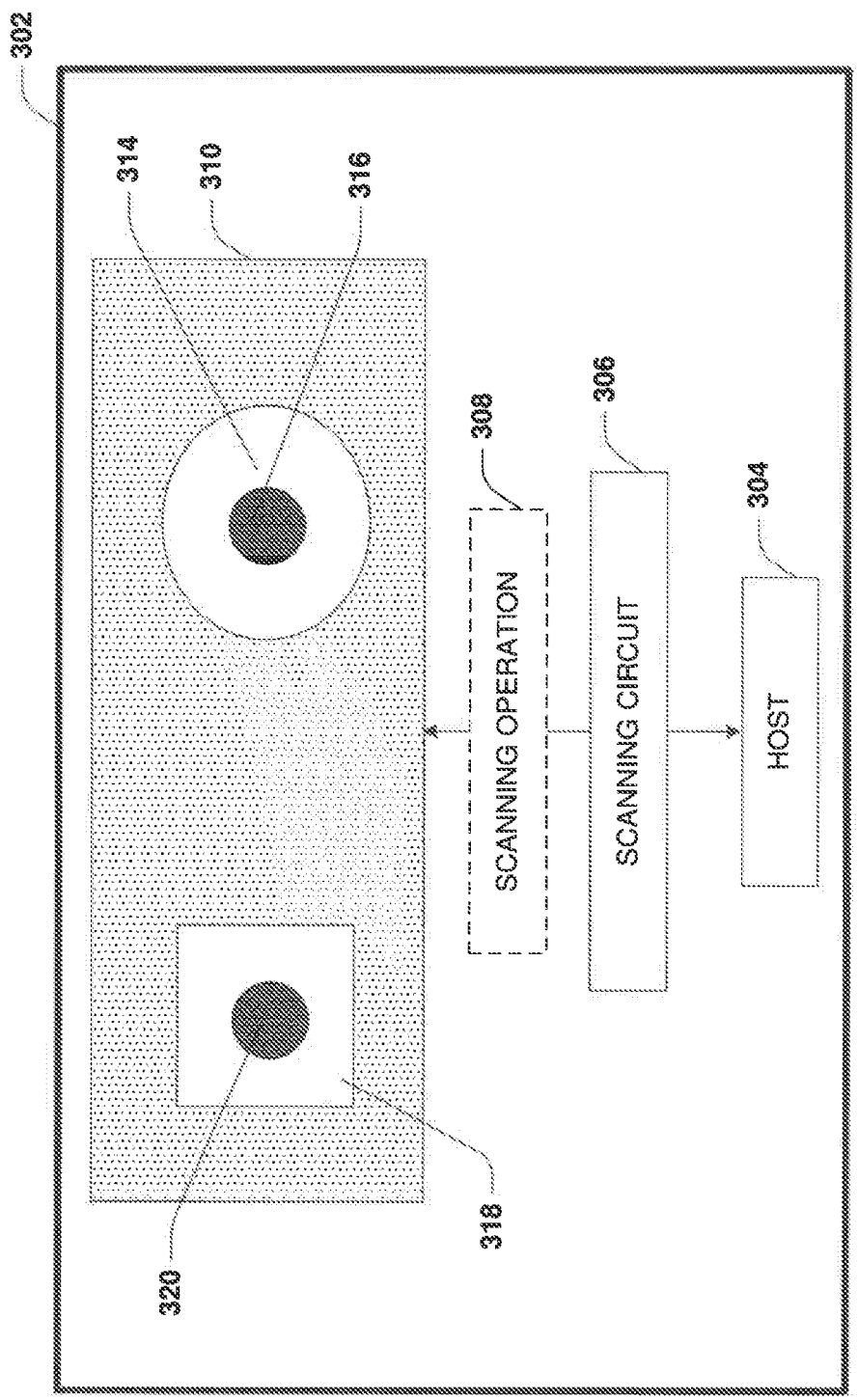
FIG. 3A is a component block diagram illustrating a device for which unintentional touch detection is implemented in accordance with at least some of the techniques presented herein.
Figure 3B:
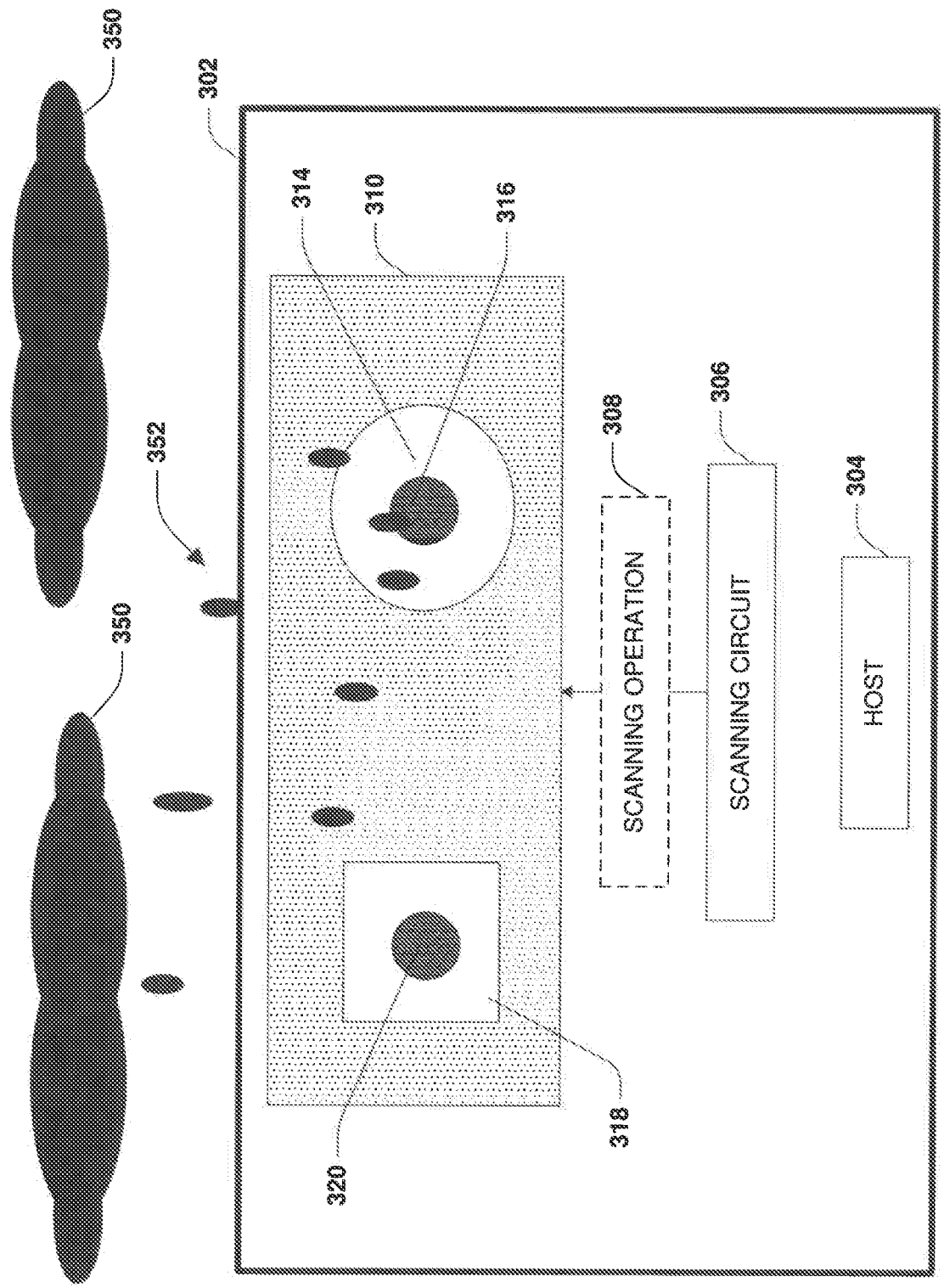
FIG. 3B is a component block diagram illustrating a device for which unintentional touch detection is implemented in accordance with at least some of the techniques presented herein.
Figure 3C:
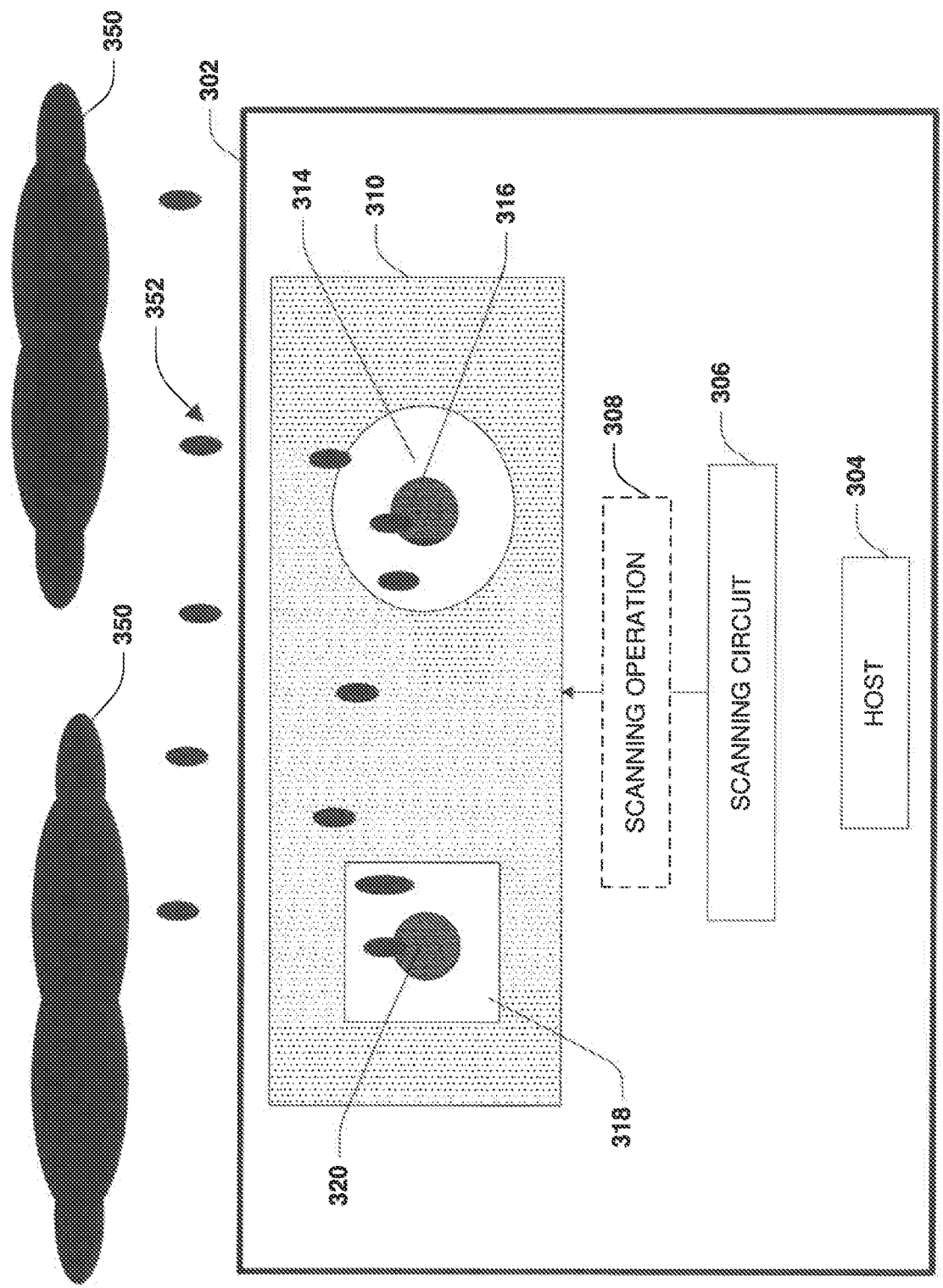
FIG. 3C is a component block diagram illustrating a device for which unintentional touch detection is implemented in accordance with at least some of the techniques presented herein.

FIG. 2 is an illustration of an example method 200 for unintentional touch detection, which is described in conjunction with device 302 of FIGS. 3A-3C. The device 302 may comprise a host 304 (e.g., a processor, firmware, a software program stored in memory and executed by the processor, etc.) that controls functions of the device 302. In some embodiments, the device 302 is a smart home security system that can be used to arm or disarm cameras, add new security detection devices, view camera video feeds, arm or disarm movement sensors, and/or other functionality that the host 304 can control. In some embodiments, the smart home security system may be mounted to a structure such as inside or outside the home, or may be portable. The device 302 comprises one or more capacitive sensors that may be part of input elements (e.g., buttons, sliders, or other input controls) of the device 302. In some embodiments, the device 302 comprises a first capacitive sensor 320 that is part of an arm camera input element (button) and a second capacitive sensor 316 that is part of a disarm camera input element (button). The arm camera input element may be used to invoke camera arm functionality through the host 304 to arm a camera controlled by the device 302. The disarm camera input element may be used to invoke camera disarm functionality through the host 304 to disarm the camera controlled by the device 302.

The device 302 may include a first proximity sensor 318 (e.g., a capacitive sensor that does not control a function of the device 302), a second proximity sensor 314, and/or other proximity sensors not illustrated. The proximity sensors may be located proximate (e.g., adjacent, partially surrounding, completely surrounding, etc.) the capacitive sensors associated with the input elements of the device 302. In some embodiments, the first proximity sensor 318 surrounds the first capacitive sensor 320 of the arm camera input element and the second proximity sensor 314 surrounds the second capacitive sensor 316 of the disarm camera input element.

A set of proximity sensors may be electrically coupled together to form a sensor arrangement. The set of proximity sensors may be dynamically selected by a selection component. The selection component may dynamically couple and decouple different sets of proximity sensors as the sensor arrangement. The set of proximity sensors are electrically coupled together as the sensor arrangement, and thus the set of proximity sensors may be electrically equivalent, but are physically separate sensors. In some embodiments, the set of proximity sensors may be electrically coupled together through a multiplexer that is connected to inputs of the proximity sensors so that the multiplexer can select/couple one or more of the proximity sensors through the inputs to group the selected/coupled proximity sensors together as the sensor arrangement. In some embodiments, the set of proximity sensors may be electrically coupled together through a wire, a trace, or other conductive material. In some embodiments, the set of proximity sensors may be electrically coupled together through an internal multiplexer within the sensor arrangement or other portion/component of the device 302.

Even though FIGS. 3A-3C illustrate an embodiment of a sensor arrangement composed of two proximity sensors, any number of proximity sensors may be electrically coupled together to form the sensor arrangement, and the device 302 may include any number of sensor arrangements used to detect unintentional touches for any number or groupings of capacitive sensors to which the sensor arrangements are mapped.

The sensor arrangement may be configured to identify unintentional touches such as due to liquid, capacitive objects, or other factors that are not related to user interactions with the input elements such as a user pressing the arm camera input element. A first threshold may be configured for the sensor arrangement. When a scanning operation 308, implemented by a scanning circuit 306 of the device 302, senses the sensor arrangement by measuring a capacitance of the sensor arrangement, the capacitance is compared to the first threshold to determine whether an unintentional touch occurred. The first threshold may be set to a larger value than a second threshold set for the capacitive sensors for detecting interaction events (e.g., a finger press of an input element). In some embodiments, the second threshold may be set to a sensor signal of about 50 or some other value, while the first threshold is set to a larger sensor signal such as about 150 or some other value. This is because a finger press will result in a value/count between around 50, while an unintentional touch will result in a larger value/count such as between about 150 and about 650 or any other range. The unintentional touch may have a larger capacitance because other sensors than the sensor arrangement being sensed/measured by the scanning operation 308 may be driven to ground, along with a ground plane 310 of the device 302. It may be appreciated that embodiments of these thresholds and measured sensor signal values will be further described in relation to FIGS. 5 and 6.

Once the sensor arrangements are defined, configured with thresholds, and are mapped to corresponding capacitive sensors, the scanning circuit 306 may perform the scanning operation 308 (e.g., periodic scans at a particular frequency such as 2,400 kHz or any other configurable frequency). During operation 202 of method 200, the scanning operation 308 measures a first capacitance of the sensor arrangement that includes the first proximity sensor 318 and the second proximity sensor 314 that are located proximate the first capacitive sensor 320 and the second capacitive sensor 316. When the scanning operation 308 is measuring the first capacitance of the sensor arrangement, other sensors may be driven to or retained at a ground potential, such as the first capacitive sensor 320, the second capacitive sensor 316, other proximity sensors and sensor arrangements, and the ground plane 310.

The scanning operation 308 measures the first capacitance of the sensor arrangement before measuring capacitances of any corresponding capacitive sensors (e.g., the first capacitive sensor 320 and the second capacitive sensor 316) so that the first capacitance is measured as a leading capacitance signal before the scanning operation 308 measures capacitances of the corresponding capacitive sensors as trailing capacitance signals. The scanning operation 308 measures the first capacitance as the leading capacitance signal so that the leading capacitance signal can be evaluated such as compared to the first threshold to determine whether to measure the capacitances of the corresponding capacitive sensors to create outputs, refrain from measuring the capacitances of the corresponding capacitive sensors, or to ignore the outputs. The corresponding capacitive sensors may relate to capacitive sensors that are mapped to the sensor arrangement (or the sensor arrangement is mapped to the capacitive sensors). In some embodiments, a single capacitive sensor or multiple capacitive sensors may be mapped to a single sensor arrangement. In some embodiments, a capacitive sensor may be mapped to a single sensor arrangement or to multiple sensor arrangements. The mappings may be predefined or user defined, or may be determined based upon various mapping criteria such as a distance between a capacitive sensor and a sensor arrangement, whether a capacitive sensor and a sensor arrangement are on a same side of the device 302, and/or other criteria that may indicate how likely liquid or a capacitive object detected by a sensor arrangement as an unintentional touch would also be detected by a capacitive sensor (e.g., erroneous detection of an interaction event such as a finger pressing a button).

A determination is made as to whether the first capacitance of the sensor arrangement exceeds or does not exceed the first threshold. If the first capacitance does not exceed the first threshold, then no unintentional touch is detected. Otherwise, if the first capacitance exceeds the first threshold, then an unintentional touch is detected. During operation 204 of method 200, the scanning operation 308 is controlled by the scanning circuit 306 to measure capacitances of the corresponding capacitive sensor(s) mapped to the sensor arrangement such as a second capacitance of the first capacitive sensor 320 and/or a third capacitance of the second capacitive sensor 316 based upon the first capacitance of the sensor arrangement not exceeding the first threshold. If a measured capacitance of a corresponding capacitive sensor (e.g., the second capacitance of the first capacitive sensor 320) exceeds a second threshold (e.g., less than the first threshold), then a function mapped to an input element that includes the capacitive sensor is modified (e.g., when a finger press of the arm camera input element is detected, the host 304 is instructed to arm the camera). In this way, operation of the scanning operation 308 is not modified because no unintentional touch was detected.

During operation 206 of method 200, operation of the scanning operation 308 is modified to control the scanning operation 308 to either skip sensing the corresponding capacitive sensor(s) for the sensor arrangement (e.g., skip measuring the second capacitance of the first capacitive sensor 320 and/or the third capacitance of the second capacitive sensor 316), or sense the corresponding capacitive sensor(s) for the sensor arrangement (e.g., measure the second capacitance of the first capacitive sensor 320 and/or the third capacitance of the second capacitive sensor 316) but refrain from transmitting outputs of the sensing to the host 304 so that the corresponding functions are not modified based upon the output. In this way, the scanning operation 308 is modified by either gating (e.g., blocking) the scanning operation 308 from measuring capacitances of the corresponding capacitive sensor(s) or gating (e.g., blocking) the scanning operation 308 from transmitting outputs derived from the measured capacitances of the corresponding capacitive sensor(s) to the host 304.

In some embodiments, operation of the scanning operation 308 is modified to skip the measuring of capacitances of the corresponding capacitive sensor(s) so that the corresponding capacitive sensor(s) can be retained in a low power mode (a sleep mode) to improve battery and power consumption of the device 302. In some embodiments, the operation of the scanning operation 308 is modified to skip the measuring of capacitances of the corresponding capacitive sensor(s) in order to reduce a total scan time of the scanning operation 308 because less capacitive sensors are being scanned, thus improving operation of the scanning circuit 306 and the device 302 (e.g., improving a response time and reducing a latency by identifying user interaction/input quicker).

FIG. 3B illustrates an embodiment of the scanning operation 308 determining that the sensor arrangement has detected an unintentional touch due to rain 352 from clouds 350. Some rain droplets of the rain 352 may land on the second proximity sensor 314 and/or the second capacitive sensor 316 of the disarm camera input element. During the scanning operation 308, a capacitance of the sensor arrangement may exceed the first threshold based upon the rain droplets landing on the second proximity sensor 314. Accordingly, the scanning operation 308 is modified to either skip measuring or to ignore an output of measuring the second capacitive sensor 316 of the disarm camera input element (and/or other corresponding sensors such as the first capacitive sensor 320) that would erroneous detect an interaction event (touch event) based upon a capacitance from the rain droplets that landed on the second capacitive sensor 316 of the disarm camera input element. In this way, operation of the scanning circuit 306 and the device 302 is improved so that the rain droplets do not cause the host 304 to invoke functionality to disarm a camera.

FIG. 3C illustrates an embodiment of the scanning operation 308 determining that the sensor arrangement has detected an unintentional touch due to the rain 352 from the clouds 350. Some rain droplets of the rain 352 may land on the second proximity sensor 314, the second capacitive sensor 316 of the disarm camera input element, the first proximity sensor 318, and/or the first capacitive sensor 320 of the arm camera input element. During the scanning operation 308, a capacitance of the sensor arrangement may exceed the first threshold based upon the rain droplets landing on the second proximity sensor 314 and the first proximity sensor 318. Accordingly, the scanning operation 308 is modified to either skip measuring or to ignore outputs of measuring corresponding sensors (e.g., the first capacitive sensor 320 and the second capacitive sensor 316) so that the corresponding sensors do not erroneous detect interaction events (touch events) based upon capacitance from the rain droplets that landed on the second capacitive sensor 316 and the first capacitive sensor 320. In this way, operation of the scanning circuit 306 and the device 302 is improved so that the rain droplets do not cause the host 304 to invoke functionality to disarm and/or disarm a camera.

Figure 4:
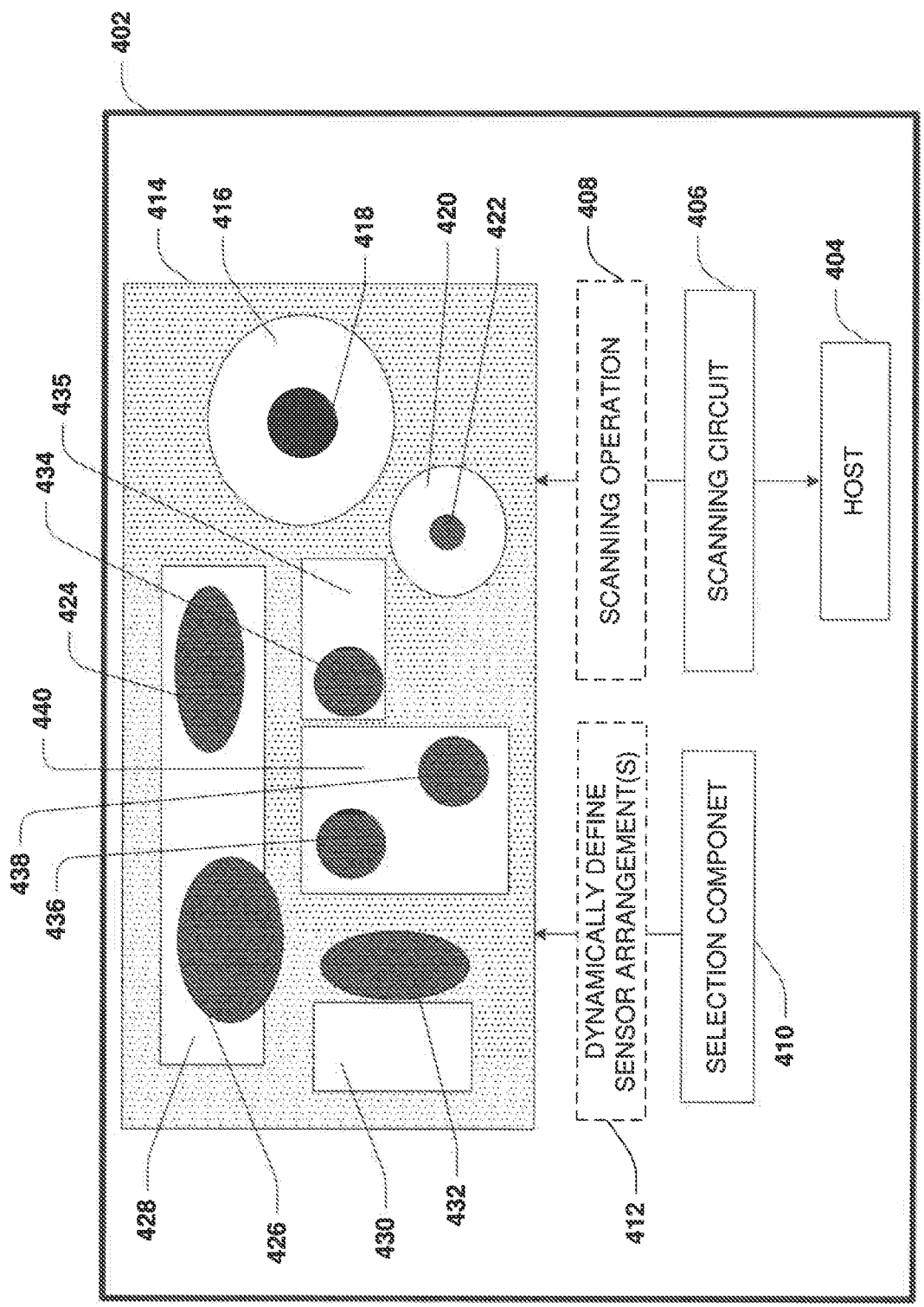
FIG. 4 is a component block diagram illustrating a device for which unintentional touch detection is implemented in accordance with at least some of the techniques presented herein.

FIG. 4 is a component block diagram illustrating a device 402 for which unintentional touch detection is implemented. The device 402 includes a host 404 configured to execute functionality of the device 402, a scanning circuit 406 that executes a scanning operation 408 to sense sensors of the device 402 by measuring capacitances of the sensors, and a selection component 410 configured to dynamically define 412 sensor arrangements. The device 402 may comprise a first capacitive sensor 418, a second capacitive sensor 422, a third capacitive sensor 424, a fourth capacitive sensor 426, a fifth capacitive sensor 432, a sixth capacitive sensor 434, a seventh capacitive sensor 436, and/or an eight capacitive sensor 438. The device 402 may comprise a first proximity sensor 416, a second proximity sensor 420, a third proximity sensor 428, a fourth proximity sensor 430, a fifth proximity sensor 440, and/or a sixth proximity sensor 435. The proximity sensors may be located proximate to (e.g., surrounding, partially surrounding, adjacent, nearby, etc.) the capacitive sensors. The device 402 may comprise a ground plane 414.

The selection component 410 is configured to dynamically define 412 sensor arrangements composed of proximity sensors selected by the selection component 410. In some embodiments, a sensor arrangement includes at least two proximity sensors. In some embodiments, a proximity sensor may be limited to being part of a single sensor arrangement. In some embodiments, a proximity sensor can be part of multiple sensor arrangements. The selection component 410 is configured to dynamically define mappings between the sensor arrangements and the conductive sensors (e.g., a mapping of a single sensor arrangement to multiple conductive sensors, a mapping of multiple sensor arrangements to a single conductive sensor, a mapping of a single sensor arrangement to a single conductive sensor, etc.). The mappings may be defined based upon various mapping criteria such as distance between a sensor arrangement and a conductive sensor, whether the sensor arrangement and the conductive sensor are on a same side of the device 402, an orientation of the device 402, whether the sensor arrangement includes a proximity sensor closest to the conductive sensor, a number of sensor arrangements already mapped to the conductive sensor (e.g., the more sensor arrangements already mapped to the conductive sensor, the less likely another sensor arrangement will also be mapped to the conductive sensor), locations of proximity sensors grouped into the sensor arrangement, etc.

In some embodiments, the selection component 410 may dynamically define 412 a first sensor arrangement that includes the first proximity sensor 416 and the second proximity sensor 420. The selection component 410 may map the first sensor arrangement to the first capacitive sensor 418 and the second capacitive sensor 422 such that the scanning operation 408 will either skip sensing or ignore an output from sensing the first capacitive sensor 418 and the second capacitive sensor 422 if the first sensor arrangement detects an unintentional touch.

In some embodiments, the selection component 410 may dynamically define 412 a second sensor arrangement that includes the second proximity sensor 420, the fifth proximity sensor 440, and the sixth proximity sensor 435. The selection component 410 may map the second sensor arrangement to the sixth capacitive sensor 434, the seventh capacitive sensor 436, and/or the eight capacitive sensor 438 such that the scanning operation 408 will either skip sensing or ignore an output from sensing the sixth capacitive sensor 434, the seventh capacitive sensor 436, and/or the eight capacitive sensor 438 if the second sensor arrangement detects an unintentional touch.

In some embodiments, the selection component 410 may dynamically define 412 a third sensor arrangement that includes the third proximity sensor 428, the fourth proximity sensor 430, and the fifth proximity sensor 440. The selection component 410 may map the third sensor arrangement to the third capacitive sensor 424, the fourth capacitive sensor 426, the fifth capacitive sensor 432, and/or the seventh capacitive sensor 436 such that the scanning operation 408 will either skip sensing or ignore an output from sensing the third capacitive sensor 424, the fourth capacitive sensor 426, the fifth capacitive sensor 432, and/or the seventh capacitive sensor 436 if the third sensor arrangement detects an unintentional touch.

The selection component 410 may dynamically redefine sensor arrangements and/or mappings of sensor arrangements to capacitive sensors based upon various factors such as a change in orientation (e.g., the device 402 is oriented such that a particular side is facing upward and is thus more susceptible to liquid spills, rain, or capacitive objects being set of that side), a proximity sensor failing, a capacitive sensor failing, detecting user feedback that an unintentional touch not detected by a sensor arrangement was incorrectly detected as a touch event by a capacitive sensor, historic information and/or user feedback indicating an imprecision of unintentional touch detection (e.g., if unintentional touches are not being detected by sensor arrangements, then new sensor arrangements and/or other mappings may be attempted to improve imprecision), etc. In some embodiments of detecting user feedback, a sensor arrangement mapped to a capacitive sensor of a volume up button may not detect spilled coffee that caused the capacitive sensor to generate outputs that increased a volume to a max level such that a user held down the volume down button for 7 seconds and cleaned up the coffee spill. These actions may be detected as user feedback based upon capacitance measurements of sensors of the device 402.

Figure 5:
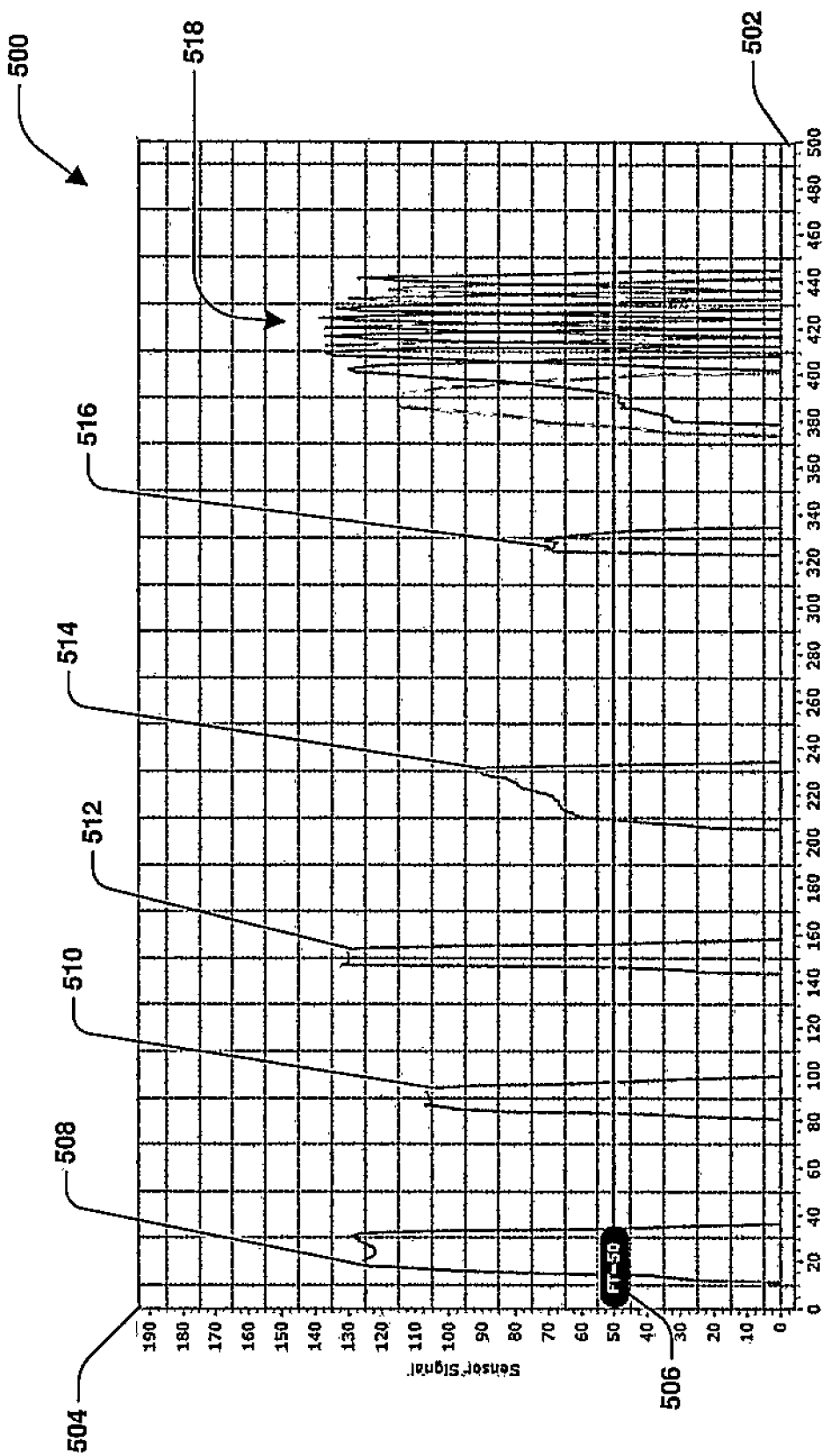
FIG. 5 is an illustration of an example of a chart illustrating capacitance signals relating to unintentional touch detection in accordance with at least some of the techniques presented herein.

FIG. 5 is an illustration of an example of a chart 500 illustrating capacitance signals relating to unintentional touch detection in accordance with at least some of the techniques presented herein. An x-axis 502 of the chart 500 represents a time duration of a scanning operation sensing sensor arrangements and capacitive sensors of input elements for measuring capacitances of such sensors. A y-axis 504 of the chart 500 represents the capacitance measurements that are sensed by the scanning operation. A threshold 506 is set for the capacitive sensors. If a measured capacitance signal of a capacitive sensor exceeds the threshold 506, then an output is generated to modify/invoke functionality that is mapped to an input element that includes the capacitive sensor.

In some embodiments, measured capacitance signal 508 corresponds to a user touching a first button, measured capacitance signal 510 corresponds to a user touching a second button, measured capacitance signal 512 corresponds to a user touching a third button, measured capacitance signal 514 corresponds to a user touching the first button, measured capacitance signal 516 corresponds to a user touching the second button, and measured capacitance signal 518 corresponds to a user interacting with a slider. The measure capacitance signals correspond to user interactions when there is no unintentional touches (e.g., where there is no liquid, rain, or capacitive objects causing the capacitive sensors to erroneous generate outputs of user interaction events). Because the sensor arrangements did not detect any unintentional touches, the scanning operation senses the measurement capacitance signals of the capacitive sensors and transmits the outputs to a host of the device for modifying/invoking corresponding functionality.

Figure 6:
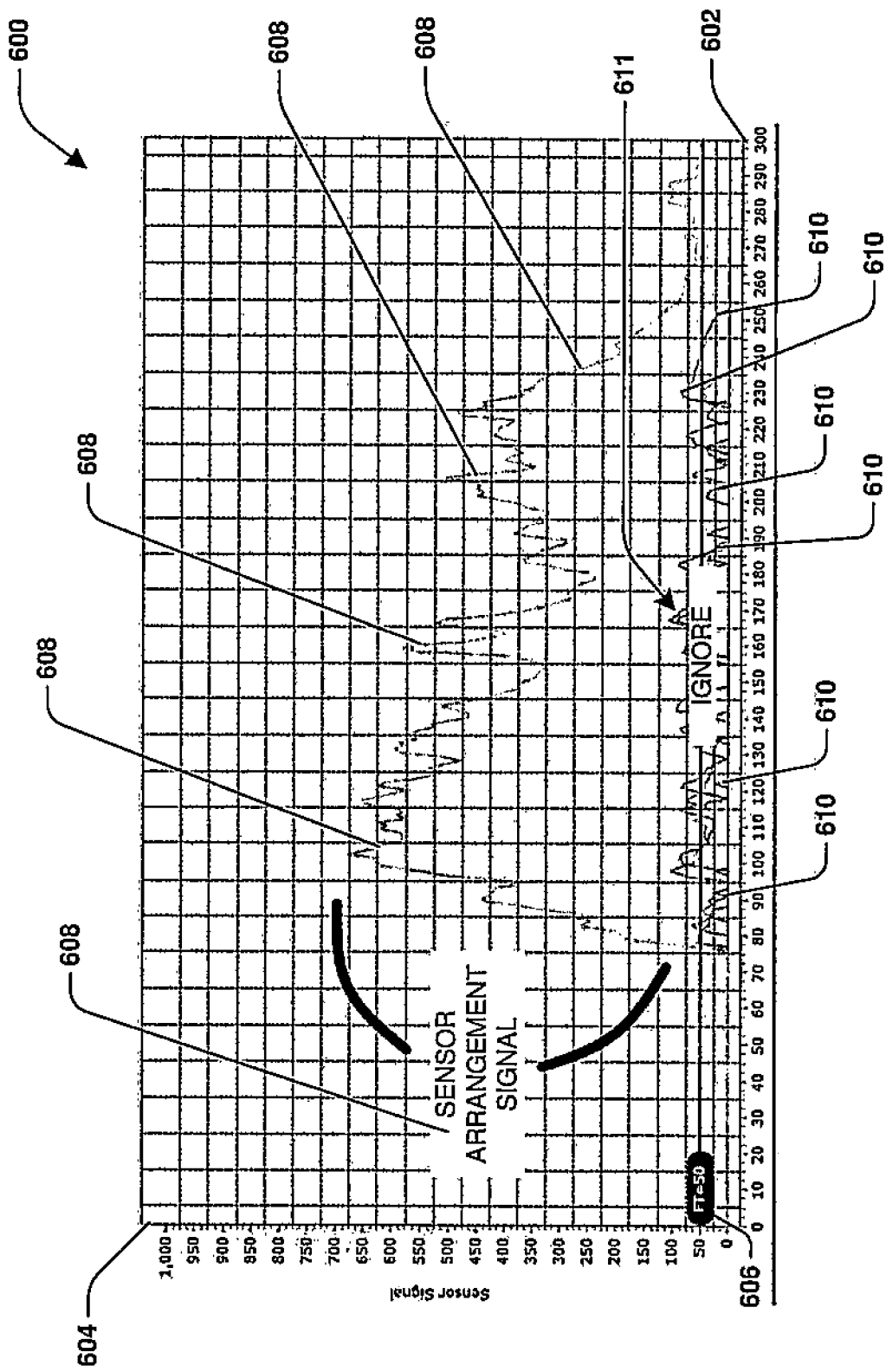
FIG. 6 is an illustration of an example of a chart illustrating capacitance signals relating to unintentional touch detection in accordance with at least some of the techniques presented herein.

FIG. 6 is an illustration of an example of a chart 600 illustrating capacitance signals relating to unintentional touch detection in accordance with at least some of the techniques presented herein. An x-axis 602 of the chart 600 represents a time duration of a scanning operation sensing sensor arrangements and capacitive sensors of input elements for measuring capacitances of such sensors. A y-axis 604 of the chart 600 represents the capacitance measurements by the scanning operation. A first threshold 606 is set for the capacitive sensors such that when a measured capacitance signal of a capacitive sensor exceeds the first threshold 606, an output is generated to invoke/modify functionality mapped to an input element that includes the capacitive sensor. A second threshold may be set for a sensor arrangement used to detect unintentional touches. The second threshold may be larger than the first threshold 606 (e.g., the first threshold 606 may be set to a finger threshold=50, and the second threshold may be set to a finger threshold=150 or some other value larger than 50 such as a finger threshold=200, a finger threshold=250, etc.).

In some embodiments, a scanning operation measures capacitance values of the sensor arrangement as a sensor arrangement signal 608. When the sensor arrangement signal 608 exceeds the second threshold, operation of the scanning operation is modified to either not measure capacitances of capacitive sensors or to measure the capacitances but ignore outputs generated from the measured capacitances. As illustrated by FIG. 6, capacitances of the capacitive sensors are measured as signals 610. However, outputs generated from the signals 610 (e.g., an output indicating that a capacitance value of a capacitive sensor exceeded the first threshold 606) are ignored 611 while the sensor arrangement signal 608 exceeds the second threshold. Once the sensor arrangement signal 608 does not exceed the second threshold, operation of the scanning operation is returned to normal for measuring capacitances of the capacitive sensors and generating and providing outputs based upon the measured capacitances.

Figure 7:
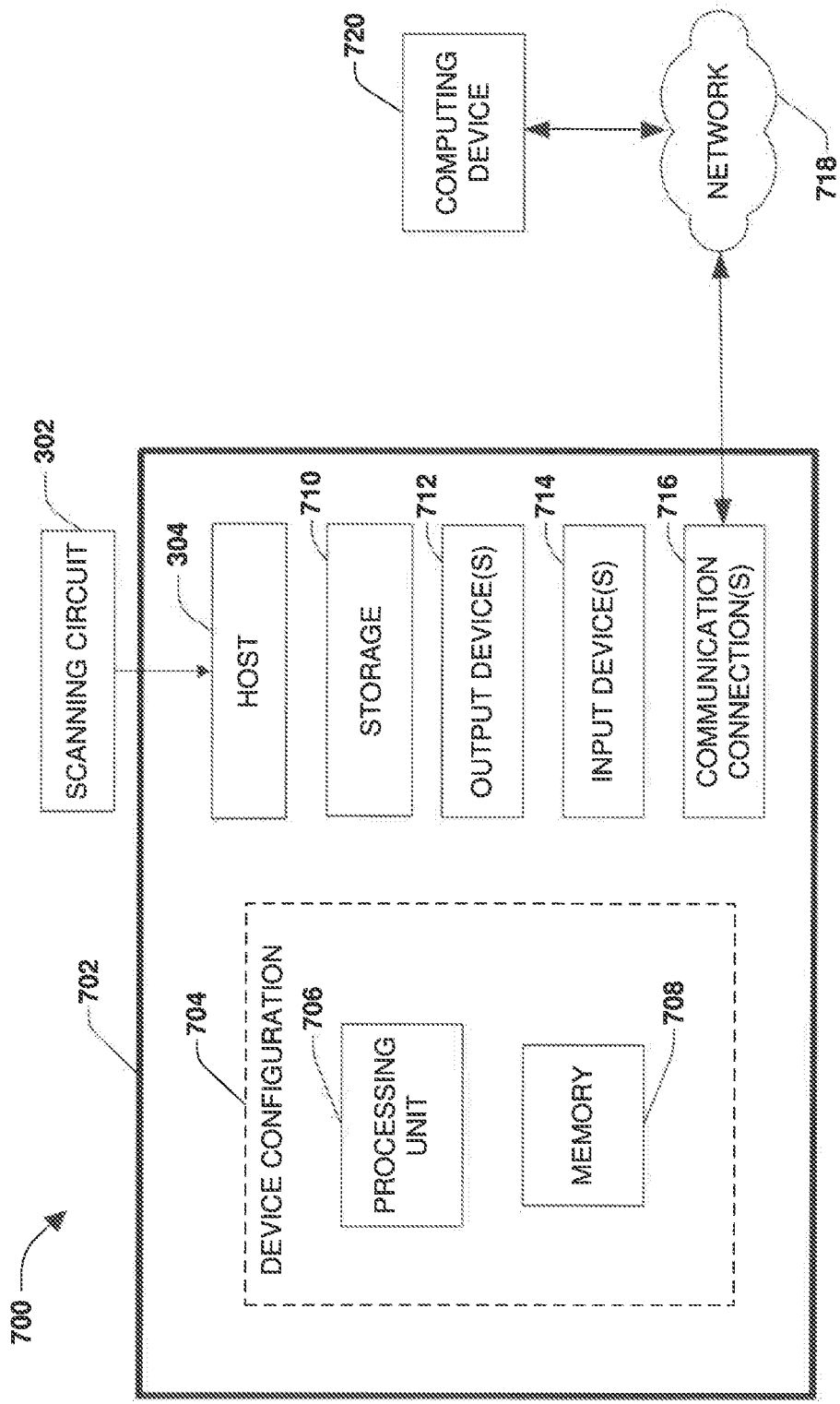
FIG. 7 illustrates an exemplary computing environment wherein one or more of the provisions set forth herein may be implemented in accordance with at least some of the techniques presented herein.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, without limitation, personal computers, server computers, hand-held or laptop devices, mobile devices (such as mobile phones, Personal Digital Assistants (PDAs), media players, and the like), kiosks, touch panel displays, printers, industrial panels, low-resolution icon-based touchscreens, multiprocessor systems, consumer electronics, smart devices (e.g., a smart speaker), mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example 700 of a system comprising a computing device 702 configured to implement one or more embodiments provided herein. In one configuration, computing device 702 includes a processing unit 706 and memory 708. Depending on the exact configuration and type of computing device, memory 708 may be volatile (such as RAM, for example), non-volatile (such as ROM, flash memory, etc., for example), or some combination of the two. This configuration is illustrated in FIG. 7 by dashed line 704.

As provided herein, the computing device 702 includes the scanning circuit 302 that is configured to detect unintentional touches (e.g., rain water, a coffee spill, ketchup, keys, or any other object) in relation to capacitive sensors (e.g., buttons, sliders, or other input components of the computing device 702 whose inputs are relayed to a host 304 of the computing device 720).

In some embodiments, device 702 may include additional features and/or functionality. For example, device 702 may also include additional storage (e.g., removable and/or non-removable) including, without limitation, magnetic storage, optical storage, and the like. Such additional storage is illustrated in FIG. 7 by storage 710. In one embodiment, computer readable instructions to implement one or more embodiments provided herein may be in storage 710. Storage 710 may also store computer readable instructions to implement an operating system, an application program, and the like. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, without limitation, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media may be part of device 702.

Device 702 may also include communication connection(s) 716 that allows device 702 to communicate with other devices. Communication connection(s) 716 may include, without limitation, a modem, a Network Interface Card (NIC), an integrated network interface, a radio frequency transmitter/receiver, an infrared port, a USB connection, or other interfaces for connecting device 702 to other computing devices. Communication connection(s) 716 may include a wired connection or a wireless connection. Communication connection(s) 716 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 702 may include input device(s) 714 such as keyboard, mouse, pen, voice input device, touch input device, infrared cameras, video input devices, and/or any other input device. Output device(s) 712 such as one or more displays, speakers, printers, and/or any other output device may also be included in device 702. Input device(s) 714 and output device(s) 712 may be connected to device 702 via a wired connection, wireless connection, or any combination thereof. In one embodiment, an input device or an output device from another computing device may be used as input device(s) 714 or output device(s) 712 for computing device 702.

Components of device 702 may be connected by various interconnects, such as a bus. Such interconnects may include a Peripheral Component Interconnect (PCI), such as PCI Express, a Universal Serial Bus (USB), Firewire (IEEE 794), an optical bus structure, an I2C serial communication bus, a serial peripheral interface (SPI), a universal asynchronous receiver/transmitter (UART), other inter-board busses, and the like. In an embodiment, components of device 702 may be interconnected by a network. For example, memory 708 may be comprised of multiple physical memory units located in different physical locations interconnected by a network.

Those skilled in the art will realize that storage devices utilized to store computer readable instructions may be distributed across a network. For example, a computing device 720 accessible via network 718 may store computer readable instructions to implement one or more embodiments provided herein. Computing device 702 may access the computing device 720 and download a part or all of the computer readable instructions for execution. Alternatively, computing device 702 may download pieces of the computer readable instructions, as needed, or some instructions may be executed at computing device 702 and some at computing device 720.

Figure 8:
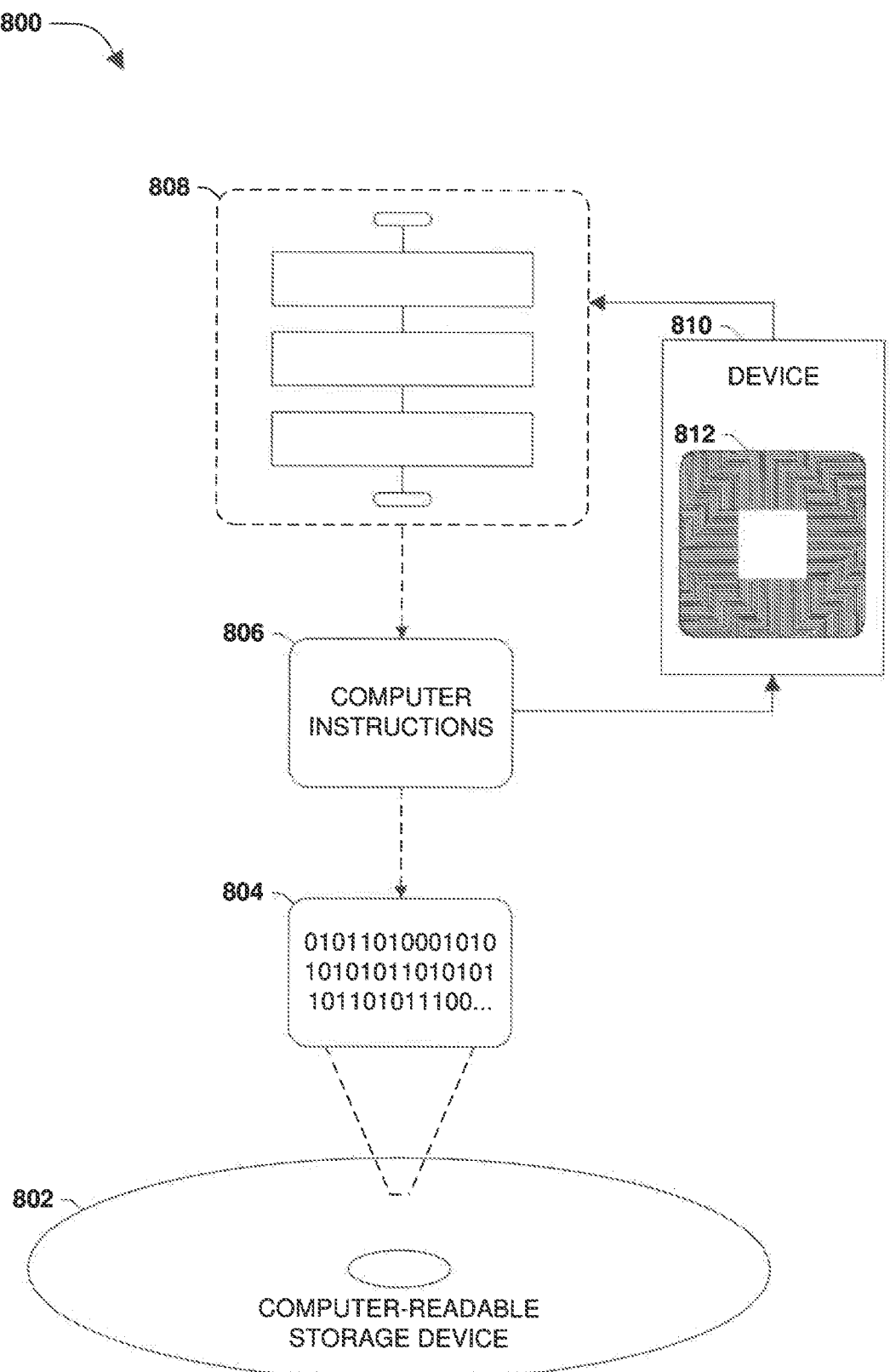
FIG. 8 is an illustration of an exemplary computer readable medium wherein processor-executable instructions configured to embody one or more of the provisions set forth herein may be comprised in accordance with at least some of the techniques presented herein.

An example computer-readable medium that may be devised in these ways is illustrated in FIG. 8, wherein the implementation 800 comprises a computer-readable memory device 802 (e.g., a CD-R, DVD-R, or a platter of a hard disk drive), on which is encoded computer-readable data 804. This computer-readable data 804 in turn comprises a set of computer instructions 806 that, when executed on a processor 812 of a device 810, provide an embodiment that causes the device 810 to operate according to the techniques presented forth herein. In some embodiments, the device 810 may correspond to a hover detection module, a sensor array, a touch panel, a printer, a kiosk, etc. Many such computer-readable media may be devised by those of ordinary skill in the art that are configured to operate in accordance with the techniques presented herein. In some embodiments, the processor-executable computer instructions 806 are configured to perform a method 808, such as at least some of the exemplary method 200 of FIG. 2, for example. In some embodiments, the processor-executable computer instructions 804 are configured to implement a system, such as at least some of the exemplary device 100 of FIGS. 1A and 1B, at least some of the exemplary device 302 of FIGS. 3A-3C, and/or at least some of the exemplary device 402 of FIG. 4, for example. Many such computer-readable media are contemplated to operate in accordance with the techniques presented herein.

An embodiment of the presently disclosed techniques includes a method. The method includes measuring, by a scanning operation, a first capacitance of a first sensor arrangement located proximate a capacitive sensor that corresponds to a function of a device; in response to the first capacitance not exceeding a first threshold, measuring, by the scanning operation, a second capacitance of the capacitive sensor to create an output used to control the function of the device; and in response to the first capacitance exceeding the first threshold, modifying operation of the scanning operation to skip measuring of the second capacitance or to refrain from transmitting the output to a host of the device for controlling the function.

According to some embodiments, the first sensor arrangement includes a plurality of proximity sensors electrically coupled together, wherein the plurality of proximity sensors are physically separate proximity sensors.

According to some embodiments, measuring the first capacitance includes: driving the capacitive sensor to ground while measuring the first capacitance of the first sensor arrangement.

According to some embodiments, measuring the first capacitance includes: driving a second sensor arrangement to ground while measuring the first capacitance of the first sensor arrangement.

According to some embodiments, the method includes selectively coupling, through a selection component, a first proximity sensor and a second proximity sensor together as the first sensor arrangement.

According to some embodiments, the method includes selectively decoupling, through the selection component, the first proximity sensor and the second proximity sensor; and selectively coupling, through the selection component, the first proximity sensor and a third proximity sensor together as the first sensor arrangement.

According to some embodiments, the method includes measuring, by the scanning operation, the first capacitance before measuring or determining whether to measure the second capacitance, wherein the first capacitance is measured as a leading capacitance signal before the scanning operation measures the second capacitance as a trailing capacitance signal.

According to some embodiments, the method includes setting the first threshold to a first value larger than a second value of a second threshold, wherein the second capacitance is compared to the second threshold to determine whether an interaction event has occurred for the capacitive sensor for modifying the function of the device.

According to some embodiments, the first capacitance exceeding the first threshold is detected as an unintentional touch that triggers the scanning operation to skip measuring of the second capacitance or to refrain from transmitting the output to the host.

According to some embodiments, a first proximity sensor and a second proximity sensor are electrically coupled together as the first sensor arrangement through at least one of a multiplexer connected to the first proximity sensor and the second proximity sensor, a wire connected to the first proximity sensor and the second proximity sensor, a trace connected to the first proximity sensor and the second proximity sensor, or an internal multiplexer within the first sensor arrangement, and the first proximity sensor and the second proximity sensor are physically separate and are electrically equivalent.

According to some embodiments, the method includes gating the scanning operation measuring capacitances of a plurality of capacitive sensors of the device or gating the scanning operation from transmitting outputs derived from the capacitances to the host based upon whether measured capacitances of one or more sensor arrangements exceed the first threshold.

According to some embodiments, the method includes modifying the function of the device based upon the output exceeding a second threshold.

According to some embodiments, modifying the operation includes retaining the capacitive sensor in a low power mode.

According to some embodiments, the modifying the operation includes reducing a scan time of the scanning operation.

An embodiment of the presently disclosed techniques includes a system. The system includes a first capacitive sensor corresponding to a first function of a device; a sensor arrangement proximate the first capacitive sensor, wherein the sensor arrangement includes a plurality of proximity sensors electrically coupled together so that the plurality of proximity sensors are electrically equivalent, and wherein the plurality of proximity sensors are physically separate proximity sensors; and a scanning circuit that implements a scanning operation to: measure a first capacitance of the sensor arrangement; in response to the first capacitance not exceeding a first threshold, measure a second capacitance of the first capacitive sensor to create a first output used to control the first function of the device; and in response to the first capacitance exceeding the first threshold, skip measuring the second capacitance or refrain from transmitting the first output to a host of the device for controlling the first function.

According to some embodiments, the system includes a second capacitive sensor; and the scanning circuit is configured to: in response to the first capacitance not exceeding the first threshold, measure a third capacitance of the second capacitive sensor to create a second output used to control a second function of the device; and in response to the first capacitance exceeding the first threshold, skip measuring the third capacitance or refrain from transmitting the second output to the host for controlling the second function.

According to some embodiments, the plurality of proximity sensors of the sensor arrangement include a first proximity sensor at least partially surrounding the first capacitive sensor and a second proximity sensor at least partially surrounding the second capacitive sensor.

According to some embodiments, the system includes a selection component that selectively couples or decouples one or more proximity sensors as the plurality of proximity sensors of the sensor arrangement.

According to some embodiments, the scanning circuit grounds the first capacitive sensor while measuring the first capacitance of the sensor arrangement.

An embodiment of the presently disclosed techniques includes a method. The method includes measuring a first capacitance of a sensor arrangement including at least two electrically coupled proximity sensors located proximate a capacitive sensor, wherein the capacitive sensor is grounded while measuring the first capacitance of the sensor arrangement; in response to the first capacitance not exceeding a first threshold, measuring a second capacitance of the capacitive sensor to create an output; and in response to the first capacitance exceeding the first threshold, skipping measuring the second capacitance or refraining from transmitting the output to a host.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application can generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application

What is claimed is:

1. A method, comprising:
    measuring, by a scanning operation, a first capacitance of a first sensor arrangement located proximate a capacitive sensor that corresponds to a function of a device;
    in response to the first capacitance not exceeding a first threshold, measuring, by the scanning operation, a second capacitance of the capacitive sensor to create an output used to control the function of the device; and
    in response to the first capacitance exceeding the first threshold, modifying operation of the scanning operation to skip measuring of the second capacitance or to refrain from transmitting the output to a host of the device for controlling the function.

2. The method of claim 1, wherein the first sensor arrangement includes a plurality of proximity sensors electrically coupled together, wherein the plurality of proximity sensors are physically separate proximity sensors.

3. The method of claim 1, wherein measuring the first capacitance comprises:
    driving the capacitive sensor to ground while measuring the first capacitance of the first sensor arrangement.

4. The method of claim 1, wherein measuring the first capacitance comprises:
    driving a second sensor arrangement to ground while measuring the first capacitance of the first sensor arrangement.

5. The method of claim 1, comprising:
    selectively coupling, through a selection component, a first proximity sensor and a second proximity sensor together as the first sensor arrangement.

6. The method of claim 5, comprising:
    selectively decoupling, through the selection component, the first proximity sensor and the second proximity sensor; and selectively coupling, through the selection component, the first proximity sensor and a third proximity sensor together as the first sensor arrangement.

7. The method of claim 1, comprising:
    measuring, by the scanning operation, the first capacitance before measuring or determining whether to measure the second capacitance, wherein the first capacitance is measured as a leading capacitance signal before the scanning operation measures the second capacitance as a trailing capacitance signal.

8. The method of claim 1, comprising:
    setting the first threshold to a first value larger than a second value of a second threshold, wherein the second capacitance is compared to the second threshold to determine whether an interaction event has occurred for the capacitive sensor for modifying the function of the device.

9. The method of claim 1, wherein the first capacitance exceeding the first threshold is detected as an unintentional touch that triggers the scanning operation to skip measuring of the second capacitance or to refrain from transmitting the output to the host.

10. The method of claim 1, wherein:
    a first proximity sensor and a second proximity sensor are electrically coupled together as the first sensor arrangement through at least one of:
        a multiplexer connected to the first proximity sensor and the second proximity sensor,
        a wire connected to the first proximity sensor and the second proximity sensor,
        a trace connected to the first proximity sensor and the second proximity sensor, or
        an internal multiplexer within the first sensor arrangement, and
    the first proximity sensor and the second proximity sensor are physically separate and are electrically equivalent.

11. The method of claim 1, comprising:
    gating the scanning operation measuring capacitances of a plurality of capacitive sensors of the device or gating the scanning operation from transmitting outputs derived from the capacitances to the host based upon whether measured capacitances of one or more sensor arrangements exceed the first threshold.

12. The method of claim 1, comprising:
    modifying the function of the device based upon the output exceeding a second threshold.

13. The method of claim 1, wherein modifying the operation comprises:
    retaining the capacitive sensor in a low power mode.

14. The method of claim 1, wherein modifying the operation comprises:
    reducing a scan time of the scanning operation.

15. A system, comprising:
    a first capacitive sensor corresponding to a first function of a device;
    a sensor arrangement proximate the first capacitive sensor, wherein the sensor arrangement comprises a plurality of proximity sensors electrically coupled together so that the plurality of proximity sensors are electrically equivalent, and wherein the plurality of proximity sensors are physically separate proximity sensors; and
    a scanning circuit that implements a scanning operation to:
        measure a first capacitance of the sensor arrangement;
        in response to the first capacitance not exceeding a first threshold, measure a second capacitance of the first capacitive sensor to create a first output used to control the first function of the device; and in response to the first capacitance exceeding the first threshold, skip measuring the second capacitance or refrain from transmitting the first output to a host of the device for controlling the first function.

16. The system of claim 15, comprising a second capacitive sensor, and wherein the scanning circuit is configured to:

in response to the first capacitance not exceeding the first threshold, measure a third capacitance of the second capacitive sensor to create a second output used to control a second function of the device; and in response to the first capacitance exceeding the first threshold, skip measuring the third capacitance or refrain from transmitting the second output to the host for controlling the second function.

17. The system of claim 16, wherein the plurality of proximity sensors of the sensor arrangement comprise a first proximity sensor at least partially surrounding the first capacitive sensor and a second proximity sensor at least partially surrounding the second capacitive sensor.

18. The system of claim 15, comprising:

a selection component that selectively couples or decouples one or more proximity sensors as the plurality of proximity sensors of the sensor arrangement.

19. The system of claim 15, wherein the scanning circuit grounds the first capacitive sensor while measuring the first capacitance of the sensor arrangement.

20. A method, comprising:

measuring a first capacitance of a sensor arrangement comprising at least two electrically coupled proximity sensors located proximate a capacitive sensor, wherein the capacitive sensor is grounded while measuring the first capacitance of the sensor arrangement;

in response to the first capacitance not exceeding a first threshold, measuring a second capacitance of the capacitive sensor to create an output; and in response to the first capacitance exceeding the first threshold, skipping measuring the second capacitance or refraining from transmitting the output to a host.

\* \* \* \* \*